May 10, 1960

M. H. BROGDEN 2,936,114

RATIO COMPUTER

Filed May 5, 1958

2 Sheets-Sheet 1

INVENTOR.
MORRIS H. BROGDEN
BY
ATTORNEY
AGENT

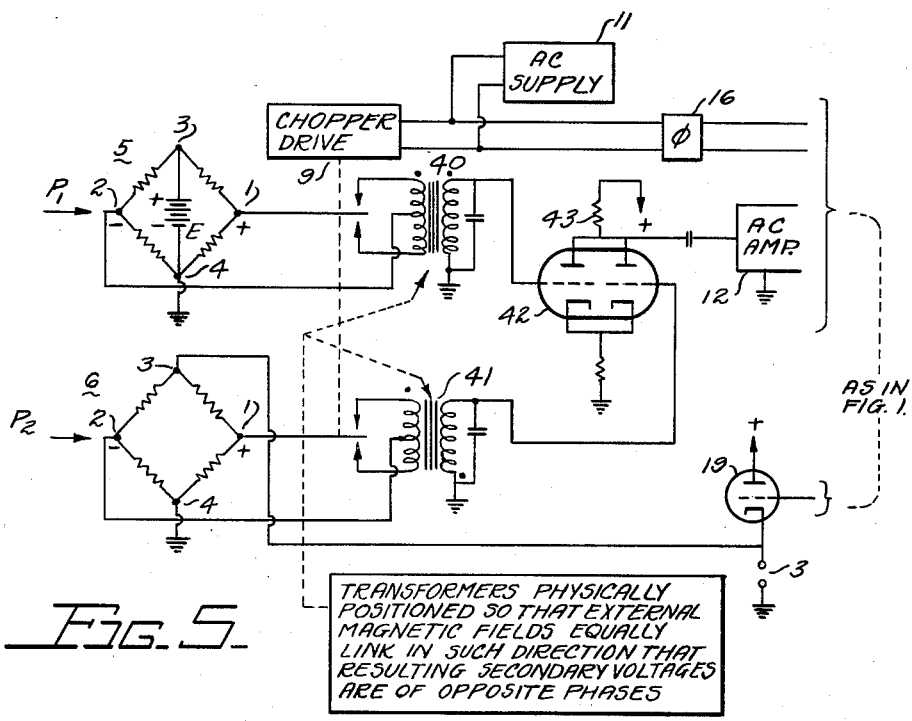
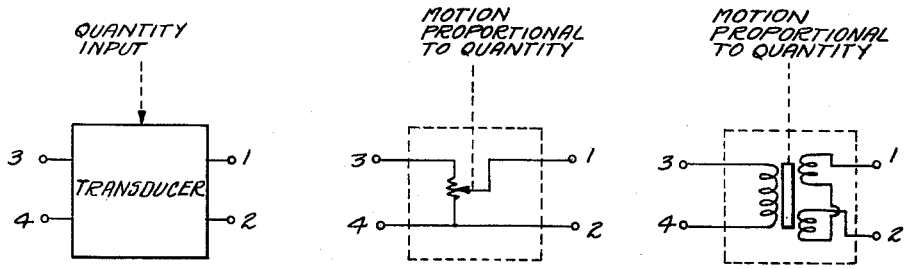

United States Patent Office 2,936,114
Patented May 10, 1960

2,936,114

RATIO COMPUTER

Morris H. Brogden, Nashville, Tenn.

Application May 5, 1958, Serial No. 732,896

1 Claim. (Cl. 235—151)

The purpose of this invention is to provide an analog computer capable of producing an output voltage proportional to the ratio of two quantities. Objects of the invention are to provide a ratio computer having a high degree of linearity, a short response time, simplicity of design, ability to accommodate a wide range of inputs, and substantial output power at low impedance for control and indication purposes. The computer is particularly suited to the determination of pressure ratios in compressor surge control systems, but has general application as well.

Briefly the computer comprises a pair of identical electrically energized transducers capable of sensing the quantity to be measured and producing an electrical output proportional to both the quantity and the energization. One transducer receives a fixed energizing voltage and the other a variable energizing voltage supplied by a high gain control circuit the input to which is an error signal proportional to the difference in transducer outputs and indicative of which is the greater. The control circuit operates in response to the error signal to change the variable energization in such direction as to drive the output of the variably energized transducer toward equality with that of the transducer having fixed energization, and to maintain these outputs near equality to a degree determined by the gain in the control circuit. Under this condition the variable energizing voltage is proportional to the ratio of the two quantities, this voltage constituting the output of the computer.

Figure 1:
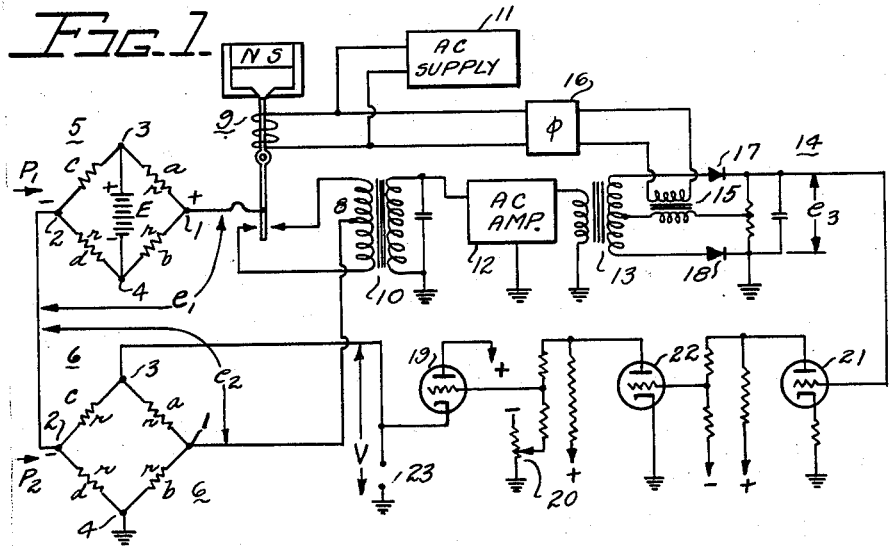
Figures 2, 3:
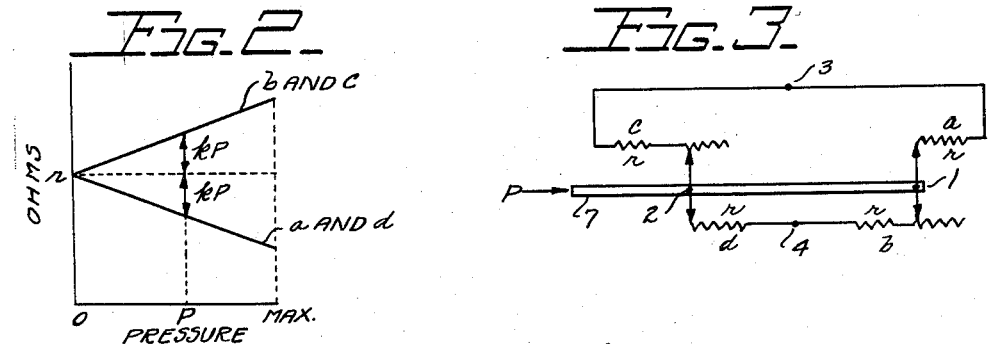
Figure 4:
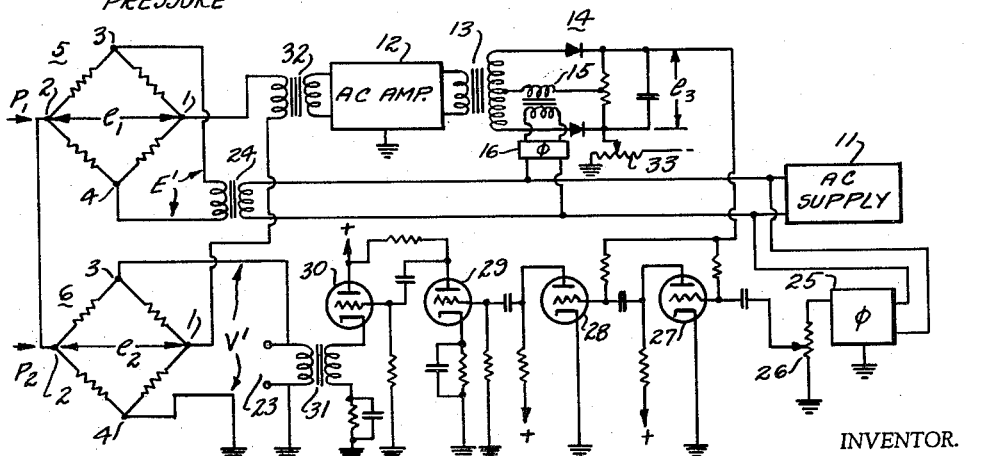

A more detailed description of the invention will be given in connection with the specific embodiments thereof shown in the accompanying drawings in which Fig. 1 is a schematic diagram of the computer using direct current energization and employed to measure pressure ratios, Fig. 2 illustrates the manner in which the transducer bridge resistors of Figs. 1 and 4 vary with pressure, Fig. 3 is an electrical and mechanical analogy of the pressure transducers used in Figs. 1 and 4, Fig. 4 is a schematic diagram of a pressure ratio computer using alternating current energization, Fig. 5 is a modification of Fig. 1 suitable for use in the presence of strong external magnetic fields, and Figs. 6, 7 and 8 illustrate transducers usable with the computer.

Referring to Fig. 1, there are shown two identical pressure transducers 5 and 6 which are subjected to pressures $P_1$ and $P_2$, respectively. Each transducer is in the form of a Wheatstone bridge having resistance arms $a$, $b$, $c$ and $d$. For zero pressure these arms have the same resistance value $r$ and as the pressure increases above zero the arm resistances vary equally from this value as shown in Fig. 2. Accordingly, for any pressure P, the resistance of each of arms $b$ and $c$ is $r+kP$ and the resistance of each of arms $a$ and $d$ is $r-kP$, where $k$ is a constant. Fig. 3 is an electrical and mechanical analogy of the pressure transducers. The analogy is shown as it would be when $P=0$, under which condition the resistances of arms $a$, $b$, $c$ and $d$ are equal and have the value $r$. As P increases, member 7 and the attached sliding contacts are moved to the right causing arms $b$ and $c$ to increase and arms $a$ and $d$ to decrease in resistance by equal amounts. It will be apparent from Figs. 2 and 3 that the sums $a+b$ and $c+d$ remain constant and equal to $2r$.

The bridge of transducer 5 has a constant energization E applied between points 3 and 4. When the bridge is balanced ($P_1=0$) the output voltage $e_1$ appearing between points 1 and 2 is zero. When $P_1$ is greater than zero, $e_1$ has a value proportional to $P_1$ and E, with point 1 positive with respect to point 2. The bridge of transducer 6 has a variable energization V applied between points 3 and 4. When the bridge is balanced ($P_2=0$) the output voltage $e_2$ appearing between points 1 and 2 is zero. When $P_2$ has a value greater than zero, $e_2$ has a value that is proportional to both $P_2$ and V, point 1 being positive relative to point 2 as in the case of $e_1$. The values of $e_1$ and $e_2$ may be expressed as follows:

(1)
$$e_1 = \frac{bE}{a+b} - \frac{dE}{c+d} = \frac{(r+kP_1)E}{(r-kP_1)+(r+kP_1)}$$
$$-\frac{(r-kP_1)E}{(r+kP_1)+(r-kP_1)} = \frac{kP_1E}{r}$$

and, similarly, (2)
$$e_2 = \frac{kP_2V}{r}$$

If V is adjusted so that $e_2=e_1$, then (3)
$$\frac{kP_2V}{r} = \frac{kP_1E}{r}$$

and, solving for V (4)
$$V = \frac{P_1}{P_2}E$$

Therefore, since E is a constant, V is proportional to the pressure ratio.

In accordance with the invention, the difference between the outputs of the two transducers, $e_1-e_2$, is used as an input error signal to a high gain amplifier circuit capable of sensing which of the voltages $e_1$ and $e_2$ is the greater. In response to this error signal the amplifier circuit adjusts the excitation V of transducer 6 in such direction as to cause $e_2$ to approach $e_1$ and the error signal to approach zero. With sufficient gain $e_2$ can be maintained very nearly equal to $e_1$ so that the voltage V, which constitutes the output of the computer, is always proportional to $P_1/P_2$ as explained above. This control of V can be accomplished in a number of ways, two of which are illustrated in the drawing.

The control circuit of Fig. 1 is suitable for use with direct current energization of the transducers. In this embodiment both E and V are direct voltages and therefore $e_1$ and $e_2$ are direct voltages. The error voltage $e_1-e_2$, which appears between points 1 and 8 and may be either positive or negative depending upon whether $e_1$ or $e_2$ is the greater, is converted into an alternating voltage of proportionate magnitude and of one or the other of two opposite phases depending upon the sign of the error voltage by the use of any suitable apparatus for this purpose. In the embodiment shown, this conversion is accomplished by means of an alternating current driven chopper 9 and a transformer 10 having a center tapped primary. The chopper is in effect an oscillating single pole double throw switch having a period equal to that of A.C. source 11 and connecting point 1 alternately to the two outer terminals of the primary of transformer 10. It is evident that an alternating voltage of the same frequency as source 11 and proportional in magnitude to the error signal will be produced across the secondary of this transformer. It is also evident that a change in polarity of the error signal between points 1 and 8 will cause a reversal in the phase of this voltage.

The alternating voltage at the secondary of transformer 10 is amplified in amplifier 12 and applied through transformer 13 to phase sensitive rectifier 14. This rectifier is also supplied with a reference phase from source 11 through transformer 15. An exact 0°–180° phase relationship is desired between the secondary voltages of transformers 13 and 15, and to achieve this condition a phase correcting network 16 may be required to correct for inherent system phase shifts. If the error signal is zero, the transformer 15 secondary voltage is the only signal applied to rectifiers 17 and 18. Consequently, the output currents of these rectifiers are equal and voltage $e_3$ is zero. In the presence of an error signal, the rectifiers will have applied to them the voltages from both transformers 13 and 15 and these voltages will have the same phase at one of the rectifiers and opposite phases at the other. The rectified currents will therefore have different magnitudes causing a resultant voltage $e_3$ to be produced having a polarity determined by the greater rectifier current. The magnitude of $e_3$, there, is proportional to the error signal $e_1-e_2$ and its polarity is determined by the polarity of the error signal. In the embodiment shown, the system phasing is made such that $e_3$ is positive when point 1 is positive relative to point 8, i.e., when $e_2$ is less than $e_1$.

The energizing voltage V for transducer 6 is derived from a source of direct potential through the anode-cathode path of cathode follower tube 19. For this purpose, the anode of this tube is connected to the positive terminal of a source of direct current and its cathode is connected to point 3 of transducer 6. Point 4 of this transducer is connected to ground which is the negative terminal of the direct current source. Preferably, with no error signal ($e_3=0$) the bias on the grid of tube 19 is adjusted at contact 20 until $V=E$. In the presence of an error signal the resulting $e_3$, after amplification in direct current amplifier stages 21 and 22, is applied to the grid of cathode follower 19 and acts to modify V in such way as to keep $e_2$ at substantial equality with $e_1$. For example, if $e_2$ is less than $e_1$ a positive $e_3$ causes the grid potential of tube 19 to rise resulting in an increase in V and, as a result, $e_2$. Conversely, if $e_2$ is greater than $e_1$ a negative $e_3$ lowers the grid potential of tube 19 and causes V and $e_2$ to decrease in magnitude. As stated before, with sufficient gain in the amplifier, $e_2$ may be held very nearly equal to $e_1$ and, under this condition, V is proportional to $P_1/P_2$. This voltage is available at output terminals 23 of the computer. As is characteristic of a cathode follower, the impedance at terminals 23 is very low permitting considerable current to be drawn from the computer for control purposes.

In Fig. 4 there is illustrated a control circuit suitable for use when the transducers are energized with alternating current. In this embodiment the transducer 5 is energized across points 3 and 4 by a fixed alternating voltage E' derived through transformer 24 from A.C. supply 11. An alternating energizing voltage V' across points 3 and 4 of transducer 6 is also derived from source 11 through a circuit consisting of phase correcting network 25, amplitude control 26, variable gain tubes 27 and 28, amplifier 29, cathode follower tube 30 and transformer 31 located in the cathode circuit of the cathode follower stage. When the bridges of transducers 5 and 6 are unbalanced alternating output voltages $e_1'$ and $e_2'$ appear between terminals 1 and 2. It is desirable that these two voltages be exactly in phase, i.e., that the points 1 of the two bridges have the same polarity at all times, and because of inherent system phase shifts a phase correcting network 25 is likely to be required to achieve this condition precisely.

An A.C. error signal $e_1'-e_2'$ having one of two opposite phases depending upon which of the two voltages $e_1'$ and $e_2'$ is the greater, is applied to the primary of transformer 32. After amplification in amplifier 12, the error signal is applied to phase sensitive rectifier 14 which also receives a reference phase from source 11 through phase correcting network 16 and transformer 15. The construction and operation of the phase sensitive rectifier is identical to that of rectifier 14 of Fig. 1 explained above. The voltage $e_3$ appears in the presence of an error signal. The phasing of the system is made such that $e_3$ is positive when $e_2'$ is less than $e_1'$ and negative when $e_2'$ is greater than $e_1'$. Consequently, when $e_2'$ is less than $e_1'$ the positive $e_3$ increases the grid potentials of variable-mu tubes 27 and 28 causing their amplifications to increase and a larger signal to be applied to the grid of tube 29, resulting in an increased V' output from cathode follower 30. On the other hand, when $e_2'$ is greater than $e_1'$ the resulting negative $e_3$ reduces the grid potentials of tubes 27 and 28, decreasing their amplifications and lowering the value of V'. Potentiometer 33 is for the purpose of biasing tubes 27 and 28 to their proper operating points.

As in Fig. 1, if sufficient gain is provided in the amplifiers of the control circuit, the above process holds $e_2'$ in substantial equality with $e_1'$ and the A.C. output voltage of the computer V', which is available at output terminals 23, is proportional to $P_1/P_2$. As in Fig. 1, the cathode follower stage 30 provides a low output impedance for the computer.

Fig. 5 shows a variation of Fig. 1 that can be used to advantage where strong magnetic fields, such as 60 c./s. power fields, are present. Because of the high gain of amplifier 12 in Fig. 1, the spurious signal induced in transformer 10 by such fields may cause an error in the output of the computer.

In Fig. 5, the D.C. outputs of transducers 5 and 6 are converted to proportional alternating voltages prior to production of the difference signal, by means of DPDT chopper 9' and transformers 40 and 41. As in Fig. 1, the chopper is driven at the frequency of alternating current source 11 so that the alternating voltages appearing across the secondaries of transformers 40 and 41 have the same frequency as source 11. As indicated, transformer 40 is poled to produce no phase shift but transformer 41 is poled to reverse the primary phase, with the result that the secondary voltage of these transformers are opposite in phase. These secondary voltages are applied to the control grids of summing amplifier 42 which produces a voltage across its load resistor 43 that is proportional to the vector sum, or scalar difference, of the two secondary voltages. This voltage constitutes the error signal and is applied to the input of amplifier 12. If the secondary voltages of transformers 40 and 41 are equal, as occurs when the outputs of transducers 5 and 6 are equal, the resulting equal and oppositely phased currents in load impedance 43 cancel and the error signal is zero. If the output of one transducer exceeds the other, the corresponding secondary voltage exceeds the other and the resulting net signal across impedance 43 has its phase determined by the greater secondary voltage. Therefore, the phase of the error signal is indicative of which of the two transducer outputs is the greater. The remainder of Fig. 5, from amplifier 12 to cathode follower 19, may be identical in construction and operation to the corresponding part of Fig. 1.

The advantage of this circuit is that, if the transformers 40 and 41 are physically positioned so that they are linked equally by external magnetic fields, such as the 60 c./s. field produced by power equipment, and in such direction that the resulting secondary voltages are opposite in phase, then no spurious signal is produced at the input to amplifier 12 by the external field and good rejection of this type of undesired pickup is obtained.

Although the specific embodiments of the computer described above are for the purpose of determining the ratio of two pressures, it is obvious that the computer could be used to give the ratio of any two quantities for which there are available suitable transducers for converting the quantity into an electrical signal proportional to the quantity and the magnitude of the electrical energization of the transducer. The transducer need not be of a bridge type.

The general form of a transducer that may be substituted for transducers 5 and 6 in Figs. 1, 4 and 5, and has correspondingly numbered terminals, is shown in Fig. 6. The transducer is energized at terminals 3—4 and its output appears at terminals 1—2. The requirement is that the output be proportional to the magnitude of the energization and the quantity to be measured, such as pressure, temperature, velocity, force, etc. Schematics of different types of transducers are shown in Figs. 7 and 8. Fig. 7 shows a simple potentiometer type that may be directly substituted in Figs. 1, 4 and 5, while Fig. 8 illustrates a differential transformer type suitable for use with alternating current energization as in Fig. 4. In this type the quantity to be measured positions a core which controls the coupling between the primary and two oppositely poled secondaries. When the quantity is zero, the core is positioned for equal coupling to the secondaries with the result that their voltages cancel and the output at terminals 1—2 is zero. Movement of the core increases the coupling to one secondary and reduces it to the other thus producing a net output with phase determined by the secondary having the greater coupling.

I claim:

A computer for providing an electrical output proportional to the ratio of two quantities comprising: first and second transducers acting, when electrically energized, to convert said quantities into electrical output signals proportional in each case to the quantity and the magnitude of the electrical energization; means for applying a fixed direct energizing voltage to said first transducer; means for applying a variable direct energizing voltage to said second transducer; means coupled to said transducers and comprising a pair of transformers for converting the output signals of said transducers into corresponding alternating voltages of proportionate amplitude at the secondaries of said transformers, said transformers being physically positioned so as to be equally linked by external magnetic fields; means including said transformers for producing an alternating error signal proportional to the difference in the magnitudes of the voltages occurring at the secondaries of said transformers and having its phase determined by the larger secondary voltage; and phase sensitive means responsive to said error signal for changing said variable energizing voltage in such direction as to bring the output of said second transducer into equality with the output of said first transducer, said variable energizing voltage constituting the output of said computer.

References Cited in the file of this patent

UNITED STATES PATENTS

| | | |
|---|---|---|
| 2,612,628 | Hornfeck | Sept. 30, 1952 |
| 2,698,134 | Agins | Dec. 28, 1954 |

OTHER REFERENCES

Waveforms (Chance et al.), 1949, pp. 668 and 669.
Electronic Analog Computers (Korn et al.), 1952, pp. 200 and 201.